(No Model.) 2 Sheets—Sheet 1.

E. HOLLINGWORTH.
SHEDDING MECHANISM FOR LOOMS.

No. 443,444. Patented Dec. 23, 1890.

WITNESSES:
Clinton Atwood
Wm L. Chase

INVENTOR:
Edward Hollingworth

By John C. Dewey, Attorney.

(No Model.) 2 Sheets—Sheet 2.
E. HOLLINGWORTH.
SHEDDING MECHANISM FOR LOOMS.
No. 443,444. Patented Dec. 23, 1890.
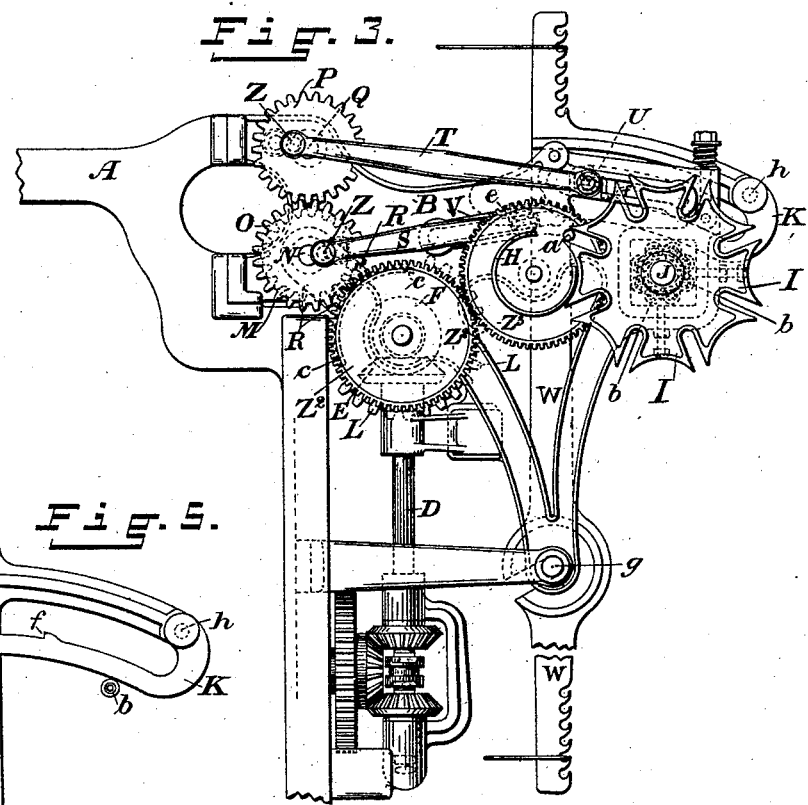
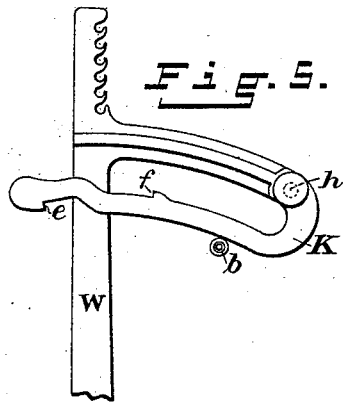
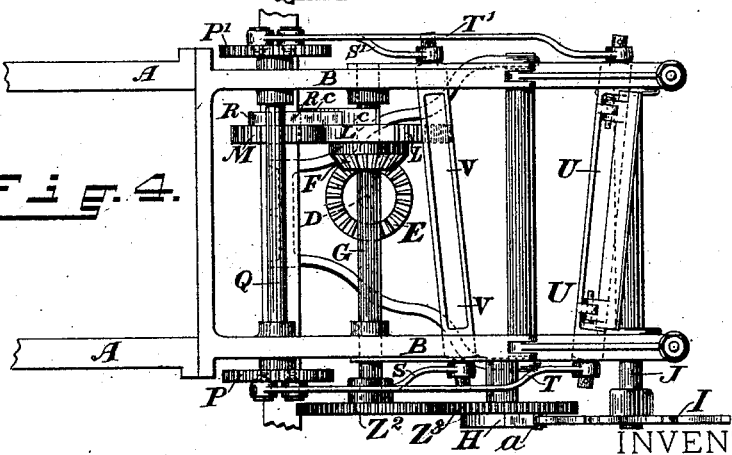
INVENTOR:
Edward Hollingworth
WITNESSES:
By John C. Dewey
Attorney.

UNITED STATES PATENT OFFICE.

EDWARD HOLLINGWORTH, OF DOBCROSS, NEAR HUDDERSFIELD, ENGLAND, ASSIGNOR TO THE KNOWLES LOOM WORKS, OF WORCESTER, MASSACHUSETTS.

SHEDDING MECHANISM FOR LOOMS.

SPECIFICATION forming part of Letters Patent No. 443,444, dated December 23, 1890.

Application filed April 9, 1890. Serial No. 347,241. (No model.) Patented in England February 28, 1889, No. 3,561.

*To all whom it may concern:*

Be it known that I, EDWARD HOLLINGWORTH, a subject of the Queen of Great Britain, residing at Dobcross, near Huddersfield, in the county of York, England, have invented certain new and useful Improvements in Shedding Mechanism for Looms, (for which I have obtained a patent in Great Britain, No. 3,561, bearing date February 28, 1889;) and I do hereby declare the following to be a full, clear, and exact description of the invention, such as will enable others skilled in the art to which it appertains to make and use the same.

My invention relates to the shedding-motion of looms for weaving, and has reference to mechanisms to be employed for operating the healds in looms, and more particularly in looms known as "closed shed."

My improvements consist in the use of a space-wheel driven by bevel-wheels on the top of the ordinary upright shaft, which receives its motion from the crank or other suitable shaft. The space-wheel is made of cogs or teeth on only a part of its periphery, the other part being without teeth.

In gear with the space-wheel is a spur-wheel on a horizontal shaft, upon the opposite ends of which shaft are two crank wheels or disks which derive their motion from the rotation of said shaft, said crank wheels or disks gearing with and driving two other crank wheels or disks secured on opposite ends of a shaft parallel with and above the first-mentioned shaft. The two sets of crank-disks, through the spur-wheel meshing with the space-wheel, are driven intermittingly, and said crank-disks "dwell" or remain stationary when the teeth are absent from the space-wheel. On the face of each of the four crank-disks is fixed a crank-pin, to which is attached one end of a connecting-rod, the other end of said rod being attached to the knives or griff-bars, so that as the said crank-disks receive their intermittent rotary motion, as above described, an intermittent reciprocatory motion is given to the knives or griff-bars, whereby the ordinary jack-levers for raising and lowering the healds are operated as they are selected by the pattern-surface, all as will be hereinafter fully described.

Figure 1:
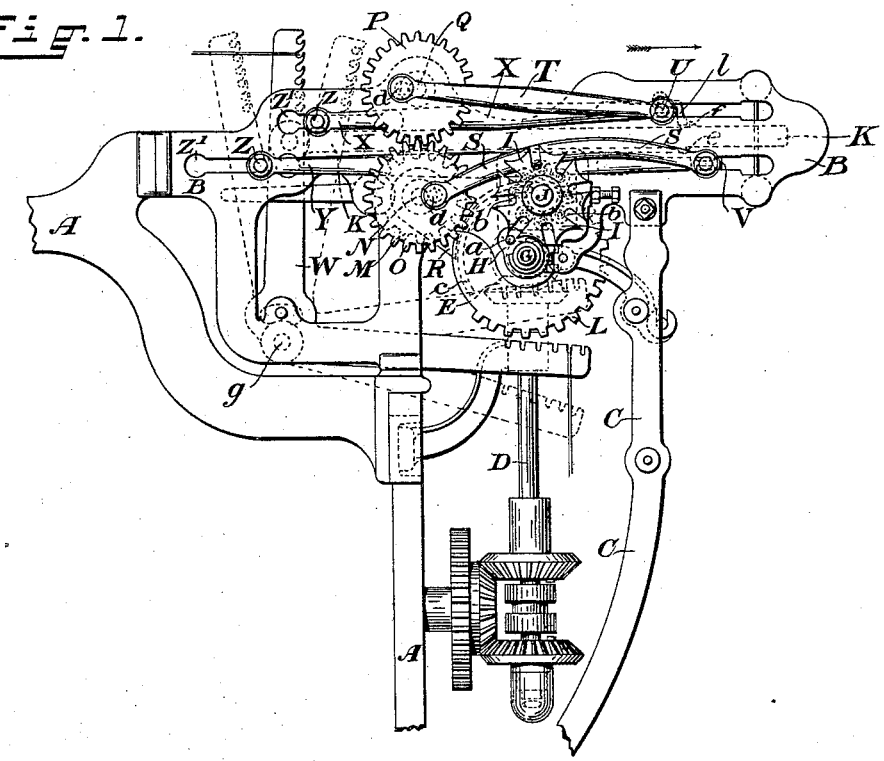
Figure 2:
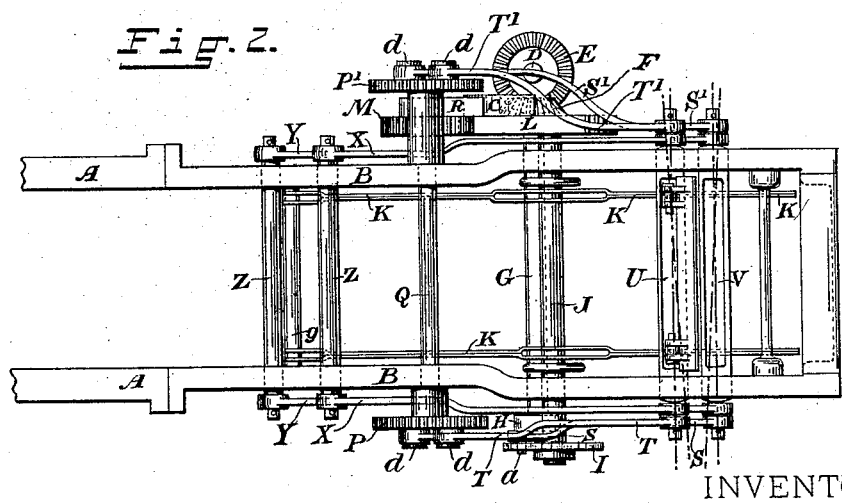

Referring to the drawings, Figure 1 is a front elevation of the head of a loom embodying my improvements. Fig. 2 is a plan view of the parts shown in Fig. 1. Fig. 3 is a front elevation of the head of a loom, showing a modification of my improvements. Fig. 4 is a plan view of the parts shown in Fig. 3. Fig. 5 is a detail of a vertical jack-lever.

In the accompanying drawings, A is the loom-frame. B is the frame-work for carrying my improved mechanism, and is supported by bracket C, connected to the loom-side. The upright shaft D has a continuous rotary motion imparted to it from the crank-shaft of the loom in the ordinary way, as fully set forth in patent to Knowles, No. 134,992.

On the upper end of the vertical shaft D is a bevel-wheel E, (see Fig. 2,) driving another bevel-wheel F, fast on the horizontal shaft G, while on the opposite end of said shaft G is a crank H, carrying a pin or stud $a$, which takes into the notches in the star-wheel I, fast on the end of the pattern or chain cylinder J, provided with bowls or pattern-pulleys $b$, so that for every revolution of the crank-shaft the pattern or chain cylinder is operated for the purpose of presenting fresh pattern-bowls $b$ to horizontal vibrating bars K, as hereinafter explained.

On the horizontal shaft G is a segment or space-wheel L, having teeth on only a part of its periphery, such teeth at every revolution of the crank-shaft taking into gear with a toothed wheel M, fixed on the horizontal shaft N, having at each end a crank wheel or disk O and O', (the latter wheel O' not shown,) the said wheels O O' gearing with and driving toothed crank wheels or disks P P' on the ends of another horizontal shaft Q, placed immediately above the other horizontal shaft N. It is therefore apparent that for every revolution of the space-wheel L the toothed crank-wheels O O' and P P' just mentioned will have an intermittent rotary motion given to them, the object of which intermittent motion is to allow the shed to be at rest or dwell during the time the shuttle is being sent across the loom, which is a desirable object to attain when the looms are broad.

During the time the space-wheel is dwelling a locking plate or device R, Figs. 1 and 2, fixed on one side of the toothed wheel M, is riding or resting upon a rim c, projecting from the space-wheel L, (see Fig. 2,) and this locking-plate is so employed as to cause the crank-disks to remain stationary when the teeth in the space-wheel are absent.

The apparatus for operating the healds consists of connecting-rods S S' and T T', which are attached to crank-pins on the faces of the toothed disks O O' and P P', respectively.

The crank-pins d, it will be observed, are fixed at opposite sides of the two horizontal shafts N and Q, (see Fig. 2,) and this is done for the purpose of imparting a to-and-fro motion to the griff-bars or knives U and V, which are attached to the opposite ends of the connecting-rods S S' and T T', so that as the said crank-disks O O' and P P' revolve the said griff-bars are made to move backward and forward horizontally for the purpose of catching hold of one or the other of two shoulders e and f, (see Fig. 1,) projecting from the horizontal vibrating bars K, which vibrating bars rest upon the pattern-pulleys b. Therefore, if one of the pulleys or bowls b is presented to a vibrator-bar K, such bar will be raised into the position shown by dotted lines, Fig. 1 of the drawings, the effect of which will be that when the upper griff-bar U advances in the direction of the arrow, Fig. 1, a catch or hinged clapper l thereon will take hold of the shoulder f on the upper side of the vibrating bar K. Consequently such bar will be pushed forward, and as the opposite end of said vibrating bar K is attached to the bell-crank or jack-lever W (see Fig. 1) such jack-lever will be made to oscillate upon its fulcrum g, whereby the healds will be operated, as will be understood by those skilled in the art.

If no pattern-bowl b is presented to the vibrating lever K, the shoulder e on the under side of said vibrator will engage with the lower griff-bar V, (see Fig. 1,) thus causing the jack-lever W to oscillate in an opposite direction to the previous movement described. Consequently the healds will be operated in the reverse direction, opening and closing the shed accordingly.

The rods X and Y and transverse bars Z are employed for the purpose of bringing the bell-crank jack-levers W to one position common in all closed-shed looms, and therefore need not be particularly described here, as they form no part of my invention.

By means of the space-wheel L and the parts connected therewith (shown in the drawings) a reliable shedding-motion is obtained, steady and smooth in all its movements, in addition to which a considerable advantage is found in attaching the connecting-rods S S' and T T' to the face of the driven crank disks or wheels O O' and P P', as the movement of the rods is much slower when the crank-pins are passing over the centers of the crank-disks, and this slow movement takes place during the time the chain-cylinder or pattern-surface is making the necessary changes. Consequently a little more time is given to the pattern-surface in which to make those changes, while the dwell given to the shed by the intermittent motion of the crank-disks during the time the shuttle is crossing the loom will be found of great advantage.

The apparatus above described is shown as applied (see Figs. 1 and 2) to that class of looms in which the healds are operated by means of bell-crank or jack levers. I have shown in Figs. 3 and 4 of the drawings how my improved shedding-motion can be applied to upright jack-levers instead of bell-crank levers. The principal parts of the mechanism already described are employed, and the same parts of mechanism are marked with the same letters of reference as those already described.

The principal difference between the two arrangements consists chiefly in substituting for the bell-crank lever W the vertical jack-lever W, all as clearly shown in Fig. 3 and in detail in Fig. 5, where it will be observed that to each vertical jack-lever is hinged at point h a vibrating bar K, provided, as in the previous case, with shoulders e and f for being taken hold of (according to the arrangement of bowls b) by the griff-bars U and V, the backward and forward movement of which gives the necessary oscillating motion to the upright jack W upon its fulcrum g, whereby the healds are operated or raised and lowered accordingly.

In the arrangement shown in Fig. 3 the crank H, carrying a pin a, is not fixed upon the horizontal shaft G, as in Figs. 1 and 2, but upon a separate stud and driven by spur-wheels $Z^2$ and $Z^3$ from the upright shaft D, as shown in Figs. 3 and 4.

It will be understood that the details of construction of the several parts of my improved mechanism may be varied somewhat from what is shown and described, if desired.

Having thus described my invention, what I claim as new, and desire to secure by Letters Patent, is—

1. In the shedding-motion of a loom, the combination, with crank-disks and connections whereby they are operative to move the harnesses for opening and closing the shed, of a continuously-driven space-wheel in gearing connection with said crank-disks and operating them intermittingly, substantially as described.

2. In the shedding-motion of a loom, the combination, with crank-disks and connections whereby they are operative to move the harnesses for opening and closing the shed, and a continuously-driven space-wheel in gearing connection with said crank-disks and operating them intermittingly, of a locking device for causing the crank-disks to remain stationary when the teeth in the space-wheel are absent, substantially as set forth.

3. In the shedding-motion of a loom, the combination, with a continuously-driven space-wheel operating intermittingly crank-disks, of said disks and connecting-rods for operating the vibrating bars and the jack-levers, substantially as set forth.

In testimony whereof I affix my signature in presence of two witnesses.

EDWARD HOLLINGWORTH.

Witnesses:
DAVID J. BAILEY,
*Solicitor, Huddersfield.*
ARTHUR B. CROSSLEY,
*Market Place, Huddersfield.*